Jan. 19, 1926.  1,570,011
J. E. SERSTÉ
MECHANISM FOR RAISING AND LOWERING THE WINDOW
FRAMES IN CONVERTIBLE VEHICLE BODIES
Filed August 7, 1924  3 Sheets-Sheet 2

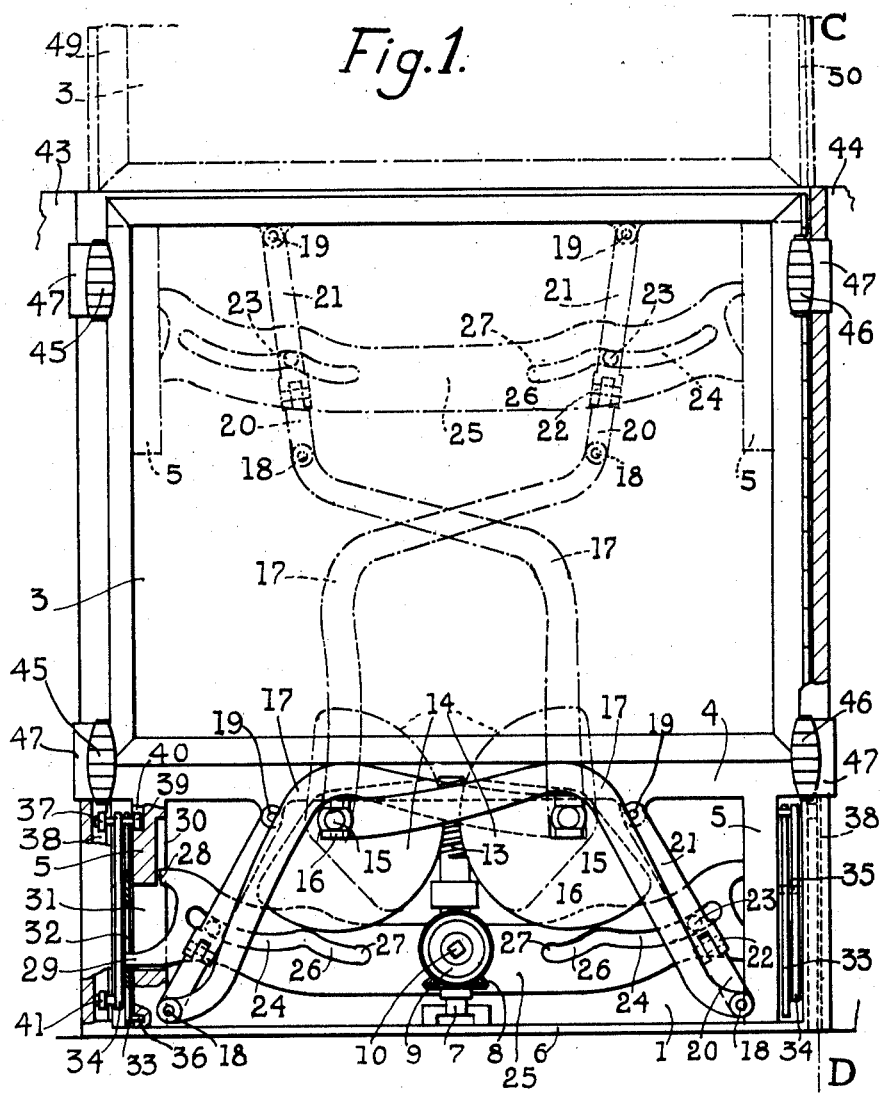
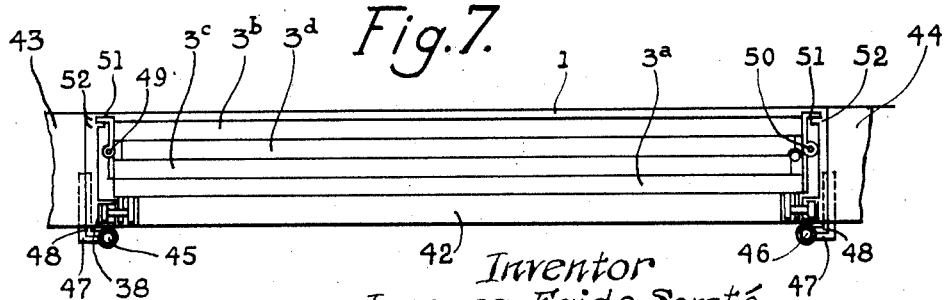

Inventor
Jacques Egide Sersté
per Towaters Attorney

Jan. 19, 1926.                                              1,570,011
J. E. SERSTÉ
MECHANISM FOR RAISING AND LOWERING THE WINDOW
FRAMES IN CONVERTIBLE VEHICLE BODIES
Filed August 7, 1924          3 Sheets-Sheet 3
Fig.3  Fig.4  Fig.5
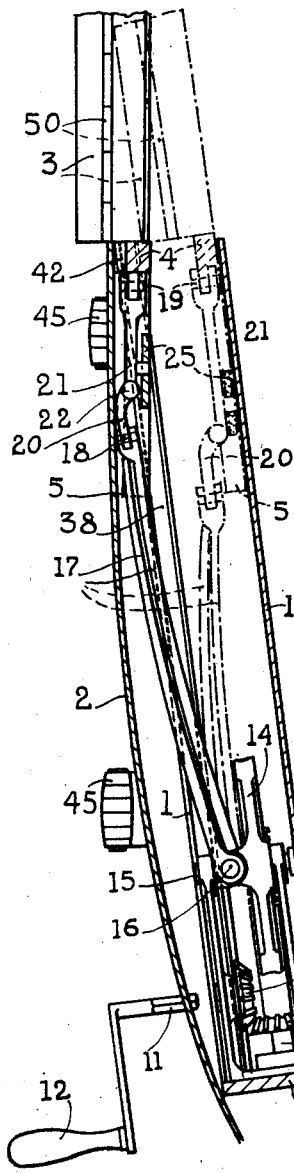
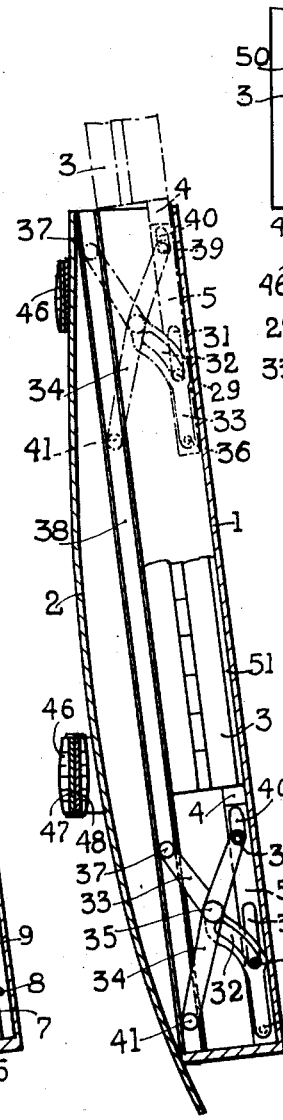
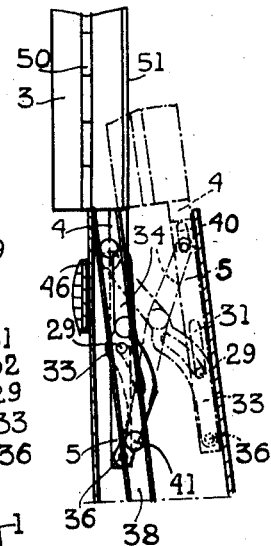
Fig.6
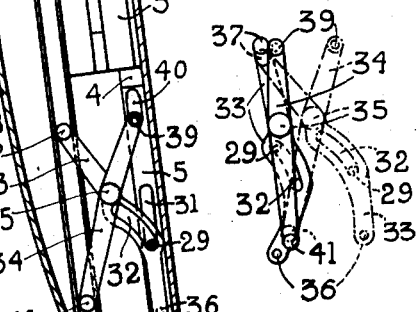
Inventor
Jacques Egide Sersté.
per [signature]. Attorney.

Patented Jan. 19, 1926.

1,570,011

UNITED STATES PATENT OFFICE.

JACQUES EGIDE SERSTÉ, OF BRUSSELS, BELGIUM.

MECHANISM FOR RAISING AND LOWERING THE WINDOW FRAMES IN CONVERTIBLE VEHICLE BODIES.

Application filed August 7, 1924. Serial No. 730,644.

*To all whom it may concern:*

Be it known that I, JACQUES EGIDE SERSTÉ, a Belgian subject, residing at 83 Rue de Wauthier, Laeken, Brussels, Belgium, have invented certain new and useful Improvements in Mechanism for Raising and Lowering the Window Frames in Convertible Vehicle Bodies, of which the following is a specification.

The present invention has reference to a mechanism for raising and lowering the folding window frames in convertible vehicle bodies and more particularly in motor car bodies. It is known to swing said frames, when folded, into grooves or recesses provided in the side walls of the car body, but this arrangement has disadvantages from the point of view of its construction which does not permit of bringing the axes of the window frame hinges into coincidence with those of the door hinges, and from the point of view of its operation which is often difficult and requires certain precautions.

The mechanism according to this invention obviates these inconveniences and permits of automatically effecting, in proper sequence, the succession of the various movements required in order to bring into position and to remove the window frames, by the action of a crank or like easily operable member. To this end one of the panels of the window frame is secured to a window carrier mounted in the groove in the vehicle body and positively controlled by sets of levers so as to rise within the groove and to move laterally when it reaches the top of its travel in order to bring the folded frame to rest on the edge of the car body. All the levers are located within the groove so that the mechanism requires, above the groove, no guiding frame which would hinder the unfolding of the window frame.

When the groove is inclined on the vertical owing to the curve which is generally found in vehicle bodies, the mechanism according to the invention is arranged so as to right the window carrier at the top of the groove, such righting preferably occurring simultaneously with the lateral movement towards the edge of the car body. The same movements are automatically reproduced in a reverse direction when the window frame is lowered into the groove.

As the above mechanism does not require that the panel in which the groove is provided be adapted to open, the door hinges may be mounted, according to this invention, in such manner that their pivots will stand in front of the said panel so that, in the position of use of the window frame, the hinges of said frame will be in alignment with the axes of the respective door hinges.

In the accompanying drawings which illustrate by way of example a constructional form of this invention applied to a motor car body:

Figs. 1 and 2 show in elevation the operating mechanism in its lowered position and in its raised position;

Fig. 3 is a vertical section on line A—B of Fig. 2;

Fig. 4 is a vertical section on line C—D of Fig. 1;

Fig. 5 is a partial section on the same line showing the parts in the same position as Fig. 2 and Fig. 6 is a separate view of the crossed levers in this position.

Fig. 7 is a plan view of the window frame in the position of Fig. 1.

Figure 2:
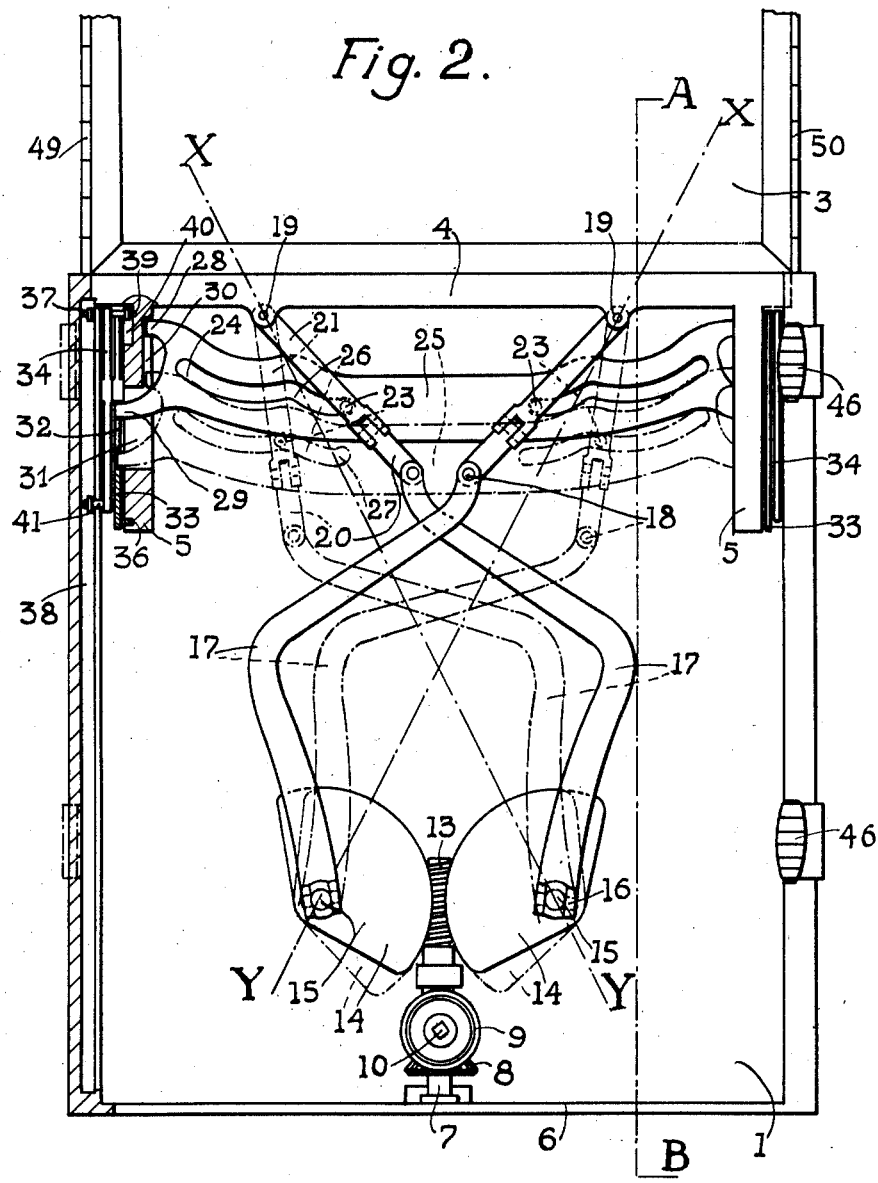

In Figs. 1 to 5 there is shown in dot-and-dash lines an intermediate position taken up by the mechanism when the window carrier is at the top of the groove.

In the example shown the groove is formed by a case 1 covered on one side by the outer sheeting 2 of the side wall of the motor body, said case being sufficiently wide to accommodate the folded window frame composed of four panels $3^a$, $3^b$, $3^c$, $3^d$ (Fig. 7). One, $3^b$, of said panels is secured to the window carrier which is formed by a rigid frame comprising a horizontal bar 4 and two uprights 5 (Figs. 1 and 2).

On the bottom 6 of the case 1 is mounted a shaft 7 on which is keyed a bevel gear 8 meshing with a pinion 9 whose hub has a square hole 10 adapted to receive the square head 11 of a crank 12 (Fig. 3). The shaft 7 is extended by a worm 13 which meshes with two symmetrical sectors 14 provided with helical teeth and journalled in the case 1 at 15 (Fig. 1). In the hub of each sector 14 is mounted a pin 16 whose ends are engaged by the fork-shaped end of a curved lever 17. The other end of lever 17 is pivoted at 18 to a lever which is pivoted at 19 to the bar 4 of the window carrier and comprises two arms 20, 21 connected by a joint 22 which enables the said lever to bend at right angles to the window carrier.

Each of the arms 21 carries a pin or a roller 23 engaging in a slot 24 of a slide 25. Each slot 24 is concentric to the pivot 19 of the corresponding arm 21 (Fig. 1) and it is extended by an eccentric slot 26 and further by a short slot 27 which is again concentric to the pivot 19 (Fig. 2). The slide 25 is adapted to slide between the uprights 5 and to that end it is provided at each end with a pin 28 guided in a groove 30 in one of the uprights 5 and a pin 29 guided in a slot 31 in said upright.

The pin 29 extends right across the slot 31 and engages in a slot 32 (Figs. 1, 2 and 4) provided in a lever 33 which is one of a pair of scissor like levers located between the upright 5 and the side of the case 1. Each of these scissor devices comprises two levers 33, 34 pivoted to one another at 35. At its lower end the lever 33 is pivotally connected to the upright 5 by means of a pin 36 while its other end carries a roller 37 guided in a grooved guide 38 forming part of the case 1 and extending parallel to the sides thereof. The arm 34 carries at its upper end a roller 39 guided in a groove 40 in the upright 5 and at its other end a roller 41 which, like the roller 37, is guided in the groove 38.

When the mechanism is in the position of Figs. 1 to 4, the frame 3 is completely enclosed within the groove in the side wall. When the crank 11, 12 is thrust into the hub of the pinion 9 and operated to rotate the worm 13, the sectors 14 swing upwardly about their axes 15 and carry with them the levers 17 which raise the window carrier through the medium of the arms 20, 21. The levers 17 cross in different planes so as not to hinder their symmetrical movements about the axes 15. During this movement the slide 25 is lifted by the rollers 23 which travel along the grooves 24 and reach the junction between the grooves 24 and 26 when the mechanism is in the intermediate position shown in dot-and-dash lines in the drawings. Up to that time, owing to the concentric relation of the slots 24 to the pivots 19 there has been no relative movement between the slide 25 and the window carrier, and these two parts have risen together in a direction parallel to the sides of the groove in the side wall.

If the worm 13 be rotated further in the same direction, the levers 17 continue to swing about the axes 15 and the window carrier continues to rise until the toggle joints 18 reach the lines X—Y joining the pivots 19 to the respective centers of rotation 15 (Fig. 2). From this moment on the window carrier moves downwardly as the obliquity of the levers 20, 21 increases until the end position shown in full lines in Fig. 2 is reached.

During that time the rollers 23 travel along the slots 26 and as these are eccentric to the pivots 19, the said rollers will raise the slide 25 relatively to the window carrier 4, 5. The pins 29 accordingly will rise within the slots 31 of the uprights 5 and as they must follow at the same time the slots 32 in the levers 33 which are pivoted to the uprights 5 at 36, the scissor devices 33, 34 are forced to close up. Since on the other hand the rollers 37 and 41 cannot leave the grooved guide 38 there ensues a lateral movement of the window carrier towards the edge 42 of the car body, the parts passing from the intermediate position shown in dot-and-dash lines to the position shown in full lines in Figs. 3 and 5.

As illustrated, the lower arms of the levers 33, 34 are longer than their upper arms so that the lower portion of the uprights 5, which is carried sideways by the pins 36, will be displaced laterally to a greater extent than the upper end of said uprights which is carried by the rollers 39. Consequently there occurs a righting of the window carrier which causes the window frame to move out of the plane of the box 1 and brings it into a vertical plane, or more generally into the plane of the windows of the car body. This movement carries the pivotal connection 36 and consequently the lower portion of the uprights 5 between and beyond the grooved guides 38, while the bar 4 is brought against the edge 42.

The combination of the lateral movement, of the righting movement and of the downward movement occurring after the toggles 17, 20, 21 have passed the lines X—Y, results in the window frame 3 coming to rest on the edge 42 of the car body. Owing to the presence of the joints 16 and 22, the levers 17, 20, 21 are enabled to follow the lateral movement of the window carrier and they do not hinder the righting thereof. On the other hand when the lateral movement is completed the rollers 23 engage in the short slots 27 which are concentric to the pivots 19, which permits of continuing the downward movement after the end of the lateral movement, the frame 3 then descending vertically onto its seat 42.

These various movements are thus effected automatically by the action of the crank operated mechanism. The crank is then withdrawn and the window panels may be unfolded in the usual manner over the doors 43, 44 on either side of the fixed panel formed by the case 1 and sheeting 2.

The pivots of the respective hinges 45, 46 of the doors 43, 44 are mounted in front of the panel 2 (Fig. 7) for example by means of angle irons 47, 48, so that when the frame 3 comes to rest on the edge 42, the hinges 49, 50 of the window 3ᵇ respectively stand in alignment with the hinges 45, 46 (Figs. 1 to 5). After they have been unfolded, the windows 3ᵃ, 3ᶜ may then be made fast to the doors by rigid connections.

The window frame being again folded up, the movements of the window carrier are reproduced in reversed order when the rotation of the crank is reversed, the window carrier being first raised, then moved laterally and inclined into the plane of the groove in the side wall, and finally lowered therein until the window frame completely disappears into the case 1. During the downward movement of the window carrier as during the upward movement described above, the window frame is guided within the groove in the side wall by flanges 51 on the hinge plates 49, 50 (Fig. 7) which slide in grooves 52 in the case 1, said flanges being adapted to cover the joints between the panels 3ᵃ, 3ᵇ, 3ᶜ when these are unfolded.

Instead of being located in a fixed panel of the car body the mechanism described may obviously be mounted in a groove provided in one of the doors forming part of the side wall of the body and various other changes may be made in its construction without departing from the scope of the invention.

I claim:

1. In a convertible vehicle body, the combination with a side wall of said body and a window frame adapted to be lowered into a groove in said side wall, of a set of levers for moving said frame along said groove, a second set of levers at an angle to the first set for laterally moving said frame at a predetermined point of its travel, and means for operating said sets of levers.

2. In a convertible vehicle body, the combination with a side wall of said body and a window frame adapted to be lowered into an inclined groove in said side wall, of a set of levers for moving said frame along said groove, a second set of levers at an angle to the first set for righting said frame at the top of said groove, and means for operating said sets of levers.

3. In a convertible vehicle body, the combination with a side wall of said body, a window frame and a case in said side wall for accommodating said frame, of two sets of levers within said case adapted respectively to move said frame along said case and transversely of said case, means for operating the first set of levers, and means for transmitting movement from the first to the second set of levers.

4. In a convertible vehicle body, the combination with a side wall of said body, a window frame and an inclined case in said side wall adapted to accommodate said frame, of a set of levers within said case for moving said frame up and down, and a second set of levers within said case operative when said frame reaches the top of its travel to simultaneously impart a transverse motion and a swinging motion to said frame.

5. In a convertible vehicle body, the combination with a side wall of said body, a window frame and a case in said side wall adapted to accommodate said frame, of a pair of toggles mounted in said case and adapted first to raise said frame above the edge of said side wall and then to lower said frame, a set of levers for moving said frame towards the edge of said side wall, and means for causing the last mentioned set of levers to become operative when said frame nears the top of its travel.

6. In a convertible vehicle body, the combination with a window frame, of means for raising and lowering said frame, a member adapted to be raised and lowered with said frame, means for moving said member relatively to said frame, and a set of levers operated by said member for laterally moving said frame.

7. In a convertible vehicle body, the combination with a window frame, of a set of levers for raising and lowering said frame, a member carried by said levers, means for producing a relative movement of said member with respect to said frame, and a second set of levers operative upon said relative movement taking place to move said frame at an angle to the first set of levers.

8. In a convertible vehicle body, the combination with a window frame, of a window carrier rigidly connected to said frame, a set of levers for raising and lowering said window carrier, a slide carried by said levers and guided in said window carrier, means for moving said slide relatively to said window carrier, and a set of levers pivotally connected to said window carrier and operated by said slide for laterally moving said window carrier.

9. In a convertible vehicle body, the combination with a side wall of said body, a window frame and a case in said side wall for accommodating said frame, of a window carrier rigidly connected to said frame, a set of levers pivotally mounted in said case and connected to said window carrier, a slide carried by said levers and guided in said window carrier, means for moving said slide relatively to said window carrier, and a set of levers pivotally connected to said window carrier and operated by said slide for laterally moving said window carrier.

10. In a convertible vehicle body, the combination with a side wall of said body, a window frame and an inclined case in said side wall for accommodating said frame, of a window carrier rigidly connected to said frame, a set of levers pivotally mounted in said case and connected to said window carrier, a slide carried by said levers and guided in said window carrier, means for moving said slide relatively to said window carrier, and a set of levers pivotally connected to said window carrier and operated by said slide for righting said window carrier at the top of its travel.

11. In a convertible vehicle body, the combination with a window frame and a case for accommodating said frame, of a window carrier rigidly connected to said frame, a set of levers in said case for raising and lowering said window carrier, pivots connecting said levers with said window carrier, a slide guide in said window carrier, said slide having slots partly concentric and partly eccentric to said pivots, projections on said levers engaging each in one of said slots, scissor like levers pivotally connected to said window carrier and guided in a groove in said case, and projections on said slide engaging in slots in said scissor levers.

12. In a convertible vehicle body, the combination with a window frame and an inclined case for accommodating said frame, of a window carrier rigidly connected to said frame, a set of levers in said case for raising and lowering said window carrier, pivots connecting said levers with said window carrier, a slide guided in said window carrier, said slide having slots partly concentric and partly eccentric to said pivots, projections on said levers engaging each in one of said slots, scissor like levers having each one of their lower arms pivoted to said window carrier, projections on said slide engaging each in a slot in one of said lower arms, and means for guiding said scissor levers in said case, the lower arms of said scissor levers being longer than their upper arms.

13. In a convertible vehicle body, the combination with a window frame and a case for accommodating said frame, of a window carrier rigidly connected to said frame, a pair of toggles pivotally mounted in said case, a pair of pivots on said window carrier connected each to one of said toggles, a slide guided in said window carrier and provided with a pair of slots, each of said slots having a portion eccentric to one of said pivots comprised between two portions concentric to said pivot, projections on said toggles engaging each in one of said slots, and means controlled by said slide for moving said window carrier at an angle to said toggles.

14. In a convertible vehicle body, the combination with a window frame and a case for accommodating said frame, of a pair of toggles pivotally mounted in said case for raising and lowering said frame, a crank, an operative connection between said crank and said toggles, a set of levers for laterally moving said frame, and means carried by said toggles for controlling the operation of said set of levers.

15. In a convertible vehicle body, the combination with a window frame and a case for accommodating said frame, of a window carrier rigidly connected to said frame, a pair of shafts rotatably mounted in said case, a pair of toggles connected each to one of said shafts and to said window carrier, a toothed sector on each of said shafts, a worm meshing with said sectors, a crank for rotating said worm, a set of levers for moving said frame transversely of said case, and means carried by said toggles for controlling the operation of said set of levers.

16. In a convertible vehicle body, the combination with a panel of said body, door hinges on said panel having their spindles in front of said panel, and a folding frame comprising windows and hinges connecting said windows with each other, said window frame being adapted to be lowered into a groove in said side wall, of means for moving said frame along said groove, and means for laterally moving said frame at the top of its travel to bring said window hinges respectively into alignment with said door hinges.

17. In a convertible vehicle body, the combination with a panel of said body, door hinges on said panel having their spindles in front of said panel, a folding frame comprising windows and hinges connecting said windows with each other, and a case in said panel adapted to accommodate said frame in the folded condition, of a set of levers mounted in said case for raising and lowering said frame, and a set of levers for moving said frame at an angle to the first set of levers to bring said window hinges respectively into alignment with said door hinges.

18. In a convertible vehicle body, the combination with a side wall of said body and a window frame adapted to be lowered into a groove in said side wall, of sets of levers for moving said frame longitudinally and transversely of said groove, said levers being mounted, and adapted to be collapsed, under said frame in its lowered position.

JACQUES EGIDE SERSTÉ.